Jan. 10, 1939. G. A. HOUSEMAN Re. 20,975

AWNING

Original Filed Nov. 25, 1935 2 Sheets-Sheet 1

Witness:
Geo. L. Hausch.

Inventor,
George A. Houseman,
Clarence E. Mahlhop, Atty.

Jan. 10, 1939. G. A. HOUSEMAN Re. 20,975
AWNING
Original Filed Nov. 25, 1935 2 Sheets-Sheet 2
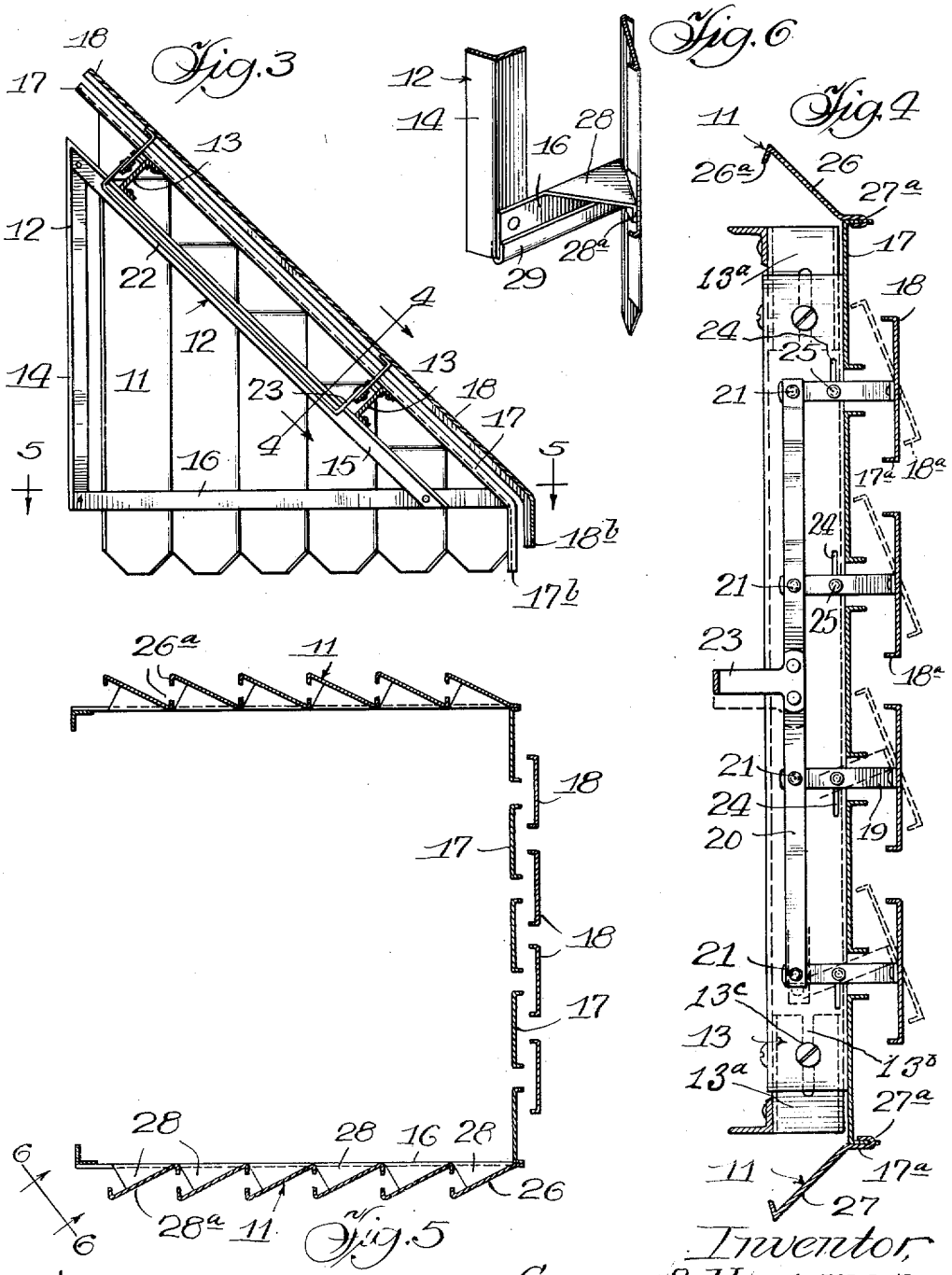
Witness:
Chas. L. Kousch.
Inventor,
George A. Houseman
Clarence E. Mehlhope Atty.

Reissued Jan. 10, 1939

Re. 20,975

UNITED STATES PATENT OFFICE 20,975

AWNING

George Alfred Houseman, Shreveport, La.

Original No. 2,098,705, dated November 9, 1937, Serial No. 51,433, November 25, 1935. Application for reissue May 5, 1938, Serial No. 206,275

19 Claims. (Cl. 156—15)

This invention relates to sheet metal awnings and consists of the matters hereinafter described and more particularly pointed out in the appended claims.

The object of the invention is to provide a novel and improved awning made of sheet metal, which is easily fabricated and readily erected and which, while offering protection against sun and rain or snow, will, at the same time admit air and light. Another object of the invention is to provide a construction of the kind including ventilating means which may be adjusted according to the direction of the wind, to deflect wind, rain or snow, as may be required by weather conditions. The advantages of the invention will appear more fully as I proceed with my specification.

In the drawings:

Figure 3 is a view representing a section through Figure 2 in a plane indicated by the line 3—3 of Figure 2;

Figure 4 is a view representing a transverse section through the roof of the awning in the plane indicated by the line 4—4 of Figure 3;

Figure 5 is a view representing a horizontal section through the awning in a plane indicated by the line 5—5 of Figure 3;

Figure 6 is a view representing a detail of construction indicated by the line 6—6 of Figure 5.

Figure 1:
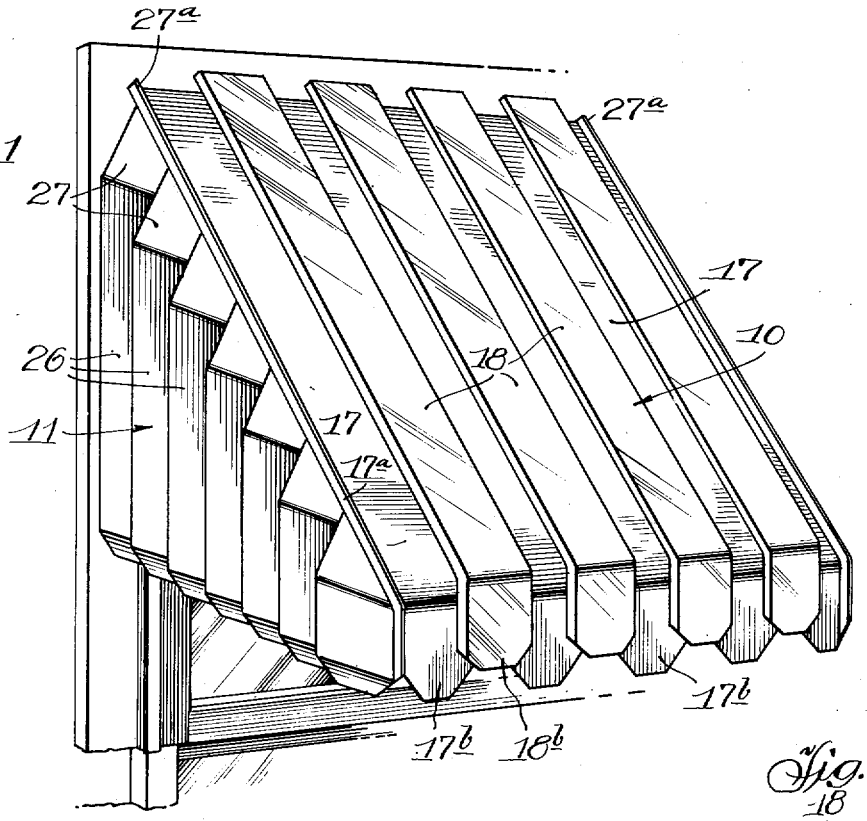
Figure 1 is a perspective view showing one form of my improved awning applied to a window.

The awning may be of any familiar form or design, either in side elevation or in plan, depending upon the form of the part of the building where the awning is to be applied and/or the taste of the designer. In the embodiment of the invention shown in the drawings, a simple side roof form applicable to a window is shown for purpose of illustration.

10 indicates the roof and 11, 11 indicate the side walls or curtains of the awning. The roof and sides are mounted on a sheet metal frame, which, in the example illustrated, consists of open triangular side members 12, 12 and cross bars or channels 13, 13 secured thereto. Each of the side frames 12, as illustrated, consists of a vertical angle bar 14 and a downwardly inclined angle bar 15 bolted together at their top ends and having their bottom, spaced ends connected by a flat bar or plate 16. The angle bar 15 is of the form required to give the desired contour in side elevation to the roof 10, which in this case is straight.

Figure 2:
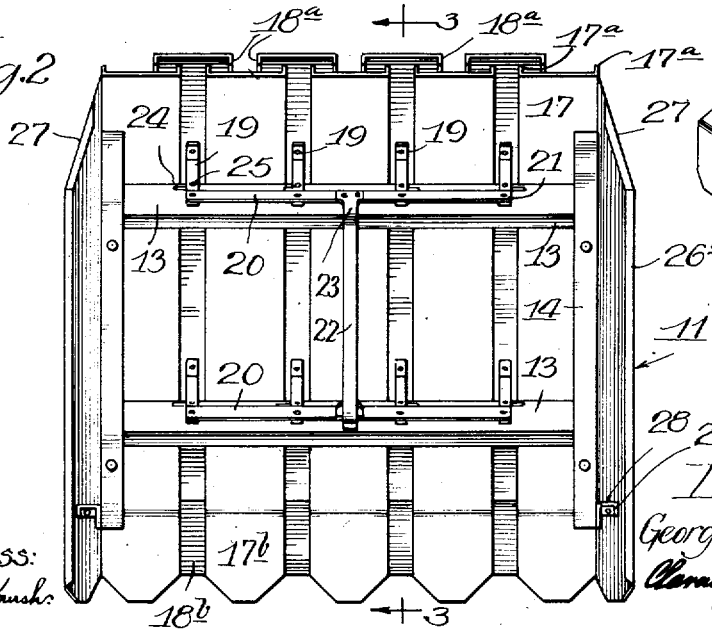
Figure 2 is a view in rear elevation as the awning appears when looked at through the window to which it is applied.

The roof 10 is comprised of a plurality of plates 17, 18 running substantially parallel to the top chords 15 of the side frames 12. The plates 17, arranged in alternation with the plates 18, are bolted in laterally spaced relation (see Figures 2 and 6) to the top flanges of the channel bars 13. The plates 18 are arranged in a plane spaced above the plane of the plate 17 and are mounted in that position by means of short bars 19, 19 disposed in the spaces separating the plates 17. Said bars 19 are attached to the channel bars 13 and may be fixed thereto so as to hold the plates 18 rigidly in their relation to the plates 17 or may be and preferably are pivoted to the webs of the channel bars 13 on bolts or studs 25 (see Fig. 4). In the normal position of the plates shown by the solid link in Figure 4, the upper plates 18 are parallel with the lower plates 17. It is readily seen that in this normal position no direct rays of light can penetrate the awning roof structure, for whatever direct rays of light come under the depending flanges of the upper plates 18 are stopped by the lower plates 17 with their upstanding flange extensions. The several short bars 19 pivoted to the channel bars 13, are each connected by a horizontal bar 20 extending below the plane of the plates 17, the connection being made by pivot bolts, as indicated at 21. The two bars 20 themselves are connected so as to be movable as one by means of a band or strip 22, located in a plane below the channel bars 13 and having upright arms 23, at its ends, which are rigidly attached to the two bars 20. Said band or strip 22 is located preferably near the middle of the awning.

By reason of the construction described, the upper plates 18 may be inclined in either direction with reference to the plates 17 by shifting the band or strip 22 to rock the upper or cover plates 18.

Figure 7:
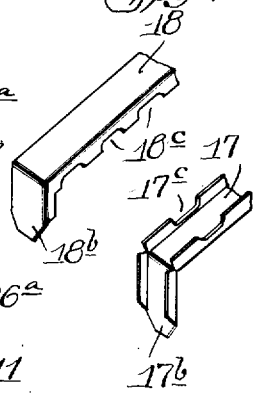
Figure 7 is a perspective view showing, in distorted association, a slightly modified form of the roof plates of the awning.

The plates 17 and 18 are provided with side flanges 17a, 18a, the flanges 17a extending upwardly and the flanges 18a extending downwardly. This provides for drainage and makes the awning rain proof. The said flanges may be continuous and of the same depth throughout, as shown in Figure 4; or again, they may be cut away to provide spaced notches, as indicated at 17c, 18c in Figure 7. Said notches in the two plates are arranged in relatively staggered relation to permit the entrance of an additional amount of air and at the same time block the entrance of water or snow.

As air is a gas it will circulate under the depending flanges of the upper plate and thence upwardly and over the upstanding flanges of the lower plates whereas snow or rain, being heavy, will fall down into the channel of the lower plates, when they strike the upstanding flanges. Furthermore, because of the overlapping of the depending flanges with the upstanding flanges in this variation of the awning structure, all direct rays of the sun are stopped from coming through the awning.

The spaces between the plates 17 may be varied in width and to this end the channel bars 13 are preferably provided with slots 24 to receive the pivot bolts 25 by which the bars 19 are mounted on said channel bars.

The outer ends of the plates 17 and 18 are disposed in a vertical plane at an angle to the main body of the plates, as indicated at 17b, 18b, to present a short skirt at the front of the awning. These ends may be of any desired form to meet the artistic requirements of the designer.

The side walls or curtains 11 are comprised of vertically disposed parallel plates 26 which are angled outwardly towards the rear of the awning. They overlap slightly at their lateral edges and at the top have a part 27 disposed at such an angle as to bring their edges into alignment with the outer flange 17a of the outermost plate 17, (see Figs. 4 and 5), to which they are attached and by which they are supported. The top margins of the plates 26 are cut to provide tongues 27a which are engaged in slots formed in the flange 17a. These side wall plates are likewise provided with side flanges 26a, 26a, to keep out weather. Said flanges in this case are oppositely turned at the two edges of said plates, as shown in Figure 5.

To support the bottom ends of the side plates 26, the bar 16 which forms the bottom chord of the frame support 12, is out and bent to provide a plurality of horizontal triangular pieces 28 (see Figs. 5 and 6) with depending flanges 28a to which the several plates 26 are connected by bolts. A strip of sheet metal 29 is bent upon itself and engaged upon the bottom margin of the bar 16 to stiffen it.

It will be obvious that the construction described is readily fabricated and easily assembled and secured together. The spaces between the plates 17 provide room for a considerable amount of adjustment to the window or other part of the building to which the awning is to be applied. It also permits fanning out of the roof plates at their outer ends, when this is required to meet the demands of the design. By varying the number of plates, an awning of any width may be produced, without otherwise changing the structure except as to the length of the channel bars 3, the other parts being the same for an awning of the particular form and design.

To provide for adjustments in the length of the channel bars 13, said channel bars are preferably provided at one or both ends with channel extensions 13a which are telescoped into the ends of the main channel bar, being provided with elongated slots 13b to provide for the adjustment and being secured to the main channel bar 13 by means of bolts or screws 13c. This provides for adjustment on the job when the awning is being erected.

For purposes of decoration, the upper plates 18 and lower plates 17 may be painted in contrasting colors, as for example, green and white, the side curtain plates being presented in alternation in similarly contrasting colors.

It will be observed that while the awning is weatherproof, ample provision is made for the admission of air and light. And the roof is made further weatherproof by the pivotal mounting of the outer plates 18, which as has been stated, may be shifted, depending upon the direction from which the wind, rain, or the like, are coming.

While in describing the invention I have referred to mechanical and structural details as to the construction of an awning embodying the invention, and have illustrated but one design of the several familiar designs of awnings to which the invention may be made to conform, it is to be understood that the invention is in no way limited thereto, except as may be pointed out in the appended claims.

I claim as my invention:

1. A sheet metal awning comprising side frames, roof cross bars connecting said frames, a plurality of narrow, laterally spaced roof plates extending transversely of said cross bars and being supported thereby in two sets in vertically spaced relation, the one set being adapted to rock relatively to the other set, the plates of the two sets being disposed so the plates of the one set cover the lateral spaces between the plates in the other set, and means for attaching the plates of the covering set to said roof bars, permitting said rocking movement.

2. A sheet metal awning comprising side frames, roof cross bars connecting said frames, a plurality of narrow, laterally spaced roof plates extending transversely of said cross bars and being supported thereby in two sets in vertically spaced relation, the one set being adapted to rock relatively to the other set, the plates of the two sets being disposed so the plates of the one set cover the lateral spaces between the plates in the other set, means for attaching the plates of the covering set to said roof bars, permitting said rocking movement, and said plates having depending ends providing a substantially vertical skirt at the front of said awning.

3. A sheet metal awning comprising side frames, roof cross bars connecting said frames, a plurality of narrow, laterally spaced roof plates having side flanges extending transversely of said cross bars and being supported thereby in two sets in vertically spaced relation, the one set being adapted to rock relatively to the other set, the plates of the two sets being relatively disposed so that the plates of the one set cover the lateral spaces between the plates in the other set, with the flanges of each set extending towards the other set of plates, and means for attaching severally the cover set of plates to the said roof bars to permit their rocking movement.

4. A sheet metal awning comprising side frames, roof cross bars connecting said frames, a plurality of narrow, laterally spaced roof plates having side flanges extending transversely of said cross bars and being supported thereby in two sets in vertically spaced relation, the one set being adapted to rock relatively to the other set, the plates of the two sets being relatively disposed so that the plates of the one set cover the lateral spaces between the plates in the other set, with the flanges of each set extending towards the other set of plates, means for attaching severally the cover set of plates to the said roof bars to permit their rocking movement, and said plates having depending ends providing a substantially vertical skirt at the front of said awning.

5. A sheet metal awning comprising side frames, roof cross bars connecting said frames, a plurality of narrow, laterally spaced roof plates having side flanges extending transversely of said cross bars and being supported thereby in two sets in vertically spaced relation, with the flanges of the upper set depending and the flanges of the lower set upright, the one set being adapted to rock relatively to the other set and being disposed to cover the lateral spaces between the plates of the lower set, and side curtains comprising substantially vertically disposed, parallel plates severally angling away from said side frames towards the rear, and means for attaching said side plates to said side frames.

6. A sheet metal awning comprising side frames, roof cross bars connecting said frames, a plurality of narrow, laterally spaced roof plates having side flanges extending transversely of said cross bars and being supported thereby in two sets in vertically spaced relation, with the flanges of the upper set depending and the flanges of the lower set upright, the one set being adapted to rock relatively to the other set and being disposed to cover the lateral spaces between the plates of the lower set, and side curtains comprising substantially vertically disposed, parallel plates severally angling away from said side frames towards the rear and each having oppositely turned side flanges, and means for attaching said side plates to said side frames.

7. In a sheet metal awning, a roof comprising cross bars, a plurality of narrow, laterally spaced roof plates extending transversely of said cross bars and being supported thereby in two sets in vertically spaced relation, the lower set of plates being fixed to said cross bars, the upper set being disposed to cover the lateral spaces between the plates in the lower set, short bars severally fixed to the plates of the upper set and depending through the spaces between the plates of the lower set, said short bars being pivotally connected to the said cross bars, and means connecting all of said short bars by which they may be operated in common to rock the plates of said upper set.

8. In a sheet metal owning, a roof comprising a plurality of narrow, laterally spaced, fixed plates, a plurality of narrow, laterally spaced plates located above said first named plates covering the space between and overlapping the margins of the fixed plates, and means for mounting the second named plates to rock about an axis parallel to their lengths with reference to the fixed plates, said fixed plates having upright side flanges and said rocking plates having depending side flanges.

9. In a sheet metal awning, a roof comprising a plurality of narrow, laterally spaced, fixed plates, a plurality of narrow, laterally spaced plates located above said first named plates covering the space between and overlapping the margins of the fixed plates, means for mounting the second named plates to rock about an axis parallel to their lengths with reference to the fixed plates, said fixed plates having upright side flanges, said rocking plates having depending side flanges, said flanges being provided with notches, the notches of the rocking and fixed plates being arranged in staggered relation.

10. In a sheet metai awning, a roof comprising cross bars, a plurality of narrow, laterally spaced roof plates extending transversely of said cross bars and being supported thereby in two sets in vertically spaced relation, the lower set of plates being fixed to said cross bars, the upper set being disposed to cover the lateral spaces between the plates in the lower set, short bars severally fixed to the plates of the upper set and depending through the spaces between the plates of the lower set, means providing pin and slot connection between said short bars and said cross bars, and means connecting all of said short bars by which they may be operated in common to rock the plates of said upper set.

11. In an awning of the class described, the combination of a series of lower spaced parallel plates having upstanding flanges mounted on a support adapted to be attached to a wall or the like in combination with a series of overlying, spaced, parallel staggered plates having depending flanges, said upper plates being mounted on the said support, closely spaced to one another and in close spaced parallel relationship with the lower plates whereby the depending flanges of one upper plate together with a lower staggered plate obstructs all direct rays of light coming over the edge of a succeeding upper plate.

12. The device as claimed in claim 11, wherein the upper plates are so closely spaced to the lower plates that the depending flanges of the upper plates overlap the upstanding flanges of the lower plates.

13. In an awning of the class described, the combination of a series of spaced lower plates mounted on a support adapted to be attached to a wall or the like, in combination with a series of spaced upper plates staggered with respect to the lower plates, said upper plates being mounted to the said support by means of rigid supports which extend from the upper plates through the spaces between the lower plates.

14. The device as claimed in claim 13, wherein the said lower plates are provided with upstanding flanges whereby to form channels.

15. The device as claimed in claim 13, wherein the said lower plates are provided with upstanding flanges extending from their edges and the said upper plates are provided with opposing depending flanges extending from their edges.

16. An awning adapted to be fastened to a wall or the like support, including a curtain comprising a series of spaced overlapping parallel vertical depending plates, angling outwardly from the awning toward the wall at not more than ninety degrees.

17. The device as claimed in claim 16 wherein the said vertical plates are provided with flanges on the vertical edges to obstruct the flow of water in a parallel direction.

18. The device as claimed in claim 16, wherein the said vertical plates are provided with roof extensions adapted to join to the main roof of the awning.

19. In an awning of the class described, the combination of a series of lower, spaced, parallel, plates having upstanding flanges provided with ventilating notches mounted on a support in combination with a series of upper, overlying, spaced, parallel, staggered plates, having depending flanges provided with ventilating notches, said upper plates being mounted on the said support, closely spaced to one another and in close parallel relationship with the lower plate, the flanges of the upper plate being in overlapping relationship with the flanges of the lower plates.

GEORGE ALFRED HOUSEMAN.